United States Patent [19]

Mikami et al.

[11] 4,398,612
[45] Aug. 16, 1983

[54] AUTOMATIC WEIGHING APPARATUS

[75] Inventors: Yoshiharu Mikami; Takashi Sashiki; Yoshiharu Asai, Shiga, Japan

[73] Assignee: Kabushiki Kaisha Ishida Koki Seisakusho, Kyoto, Japan

[21] Appl. No.: 245,351

[22] Filed: Mar. 19, 1981

[30] Foreign Application Priority Data

Mar. 25, 1980 [JP] Japan ............................. 55-40018[U]
Sep. 22, 1980 [JP] Japan ........................... 55-131924[U]

[51] Int. Cl.³ ...................... G01G 19/04; G01G 21/28
[52] U.S. Cl. ......................................... 177/25; 177/58; 222/63; 222/196
[58] Field of Search ............................. 177/25, 54, 58; 209/592; 222/56, 63, 196, 330, 409

[56] References Cited

U.S. PATENT DOCUMENTS

| 3,108,647 | 10/1963 | Harmon et al. | 177/58 X |
| 3,300,098 | 1/1967 | Quester et al. | 222/196 |
| 3,512,680 | 5/1970 | Krolopp | 222/330 X |
| 4,308,928 | 1/1982 | Oshima | 177/54 X |
| 4,313,507 | 2/1982 | Hays | 209/592 X |

Primary Examiner—George H. Miller, Jr.
Attorney, Agent, or Firm—Armstrong, Nikaido, Marmelstein & Kubovcik

[57] ABSTRACT

An automatic weighing apparatus with a dispersion feed apparatus comprising a plurality of feed troughs adapted to be separately vibrated and radially arranged around the outer periphery of a dispersion table which performs spiral reciprocating vibratory motion, the feed troughs being separately vibrated at predetermined times to feed articles to associated weighing units.

15 Claims, 9 Drawing Figures

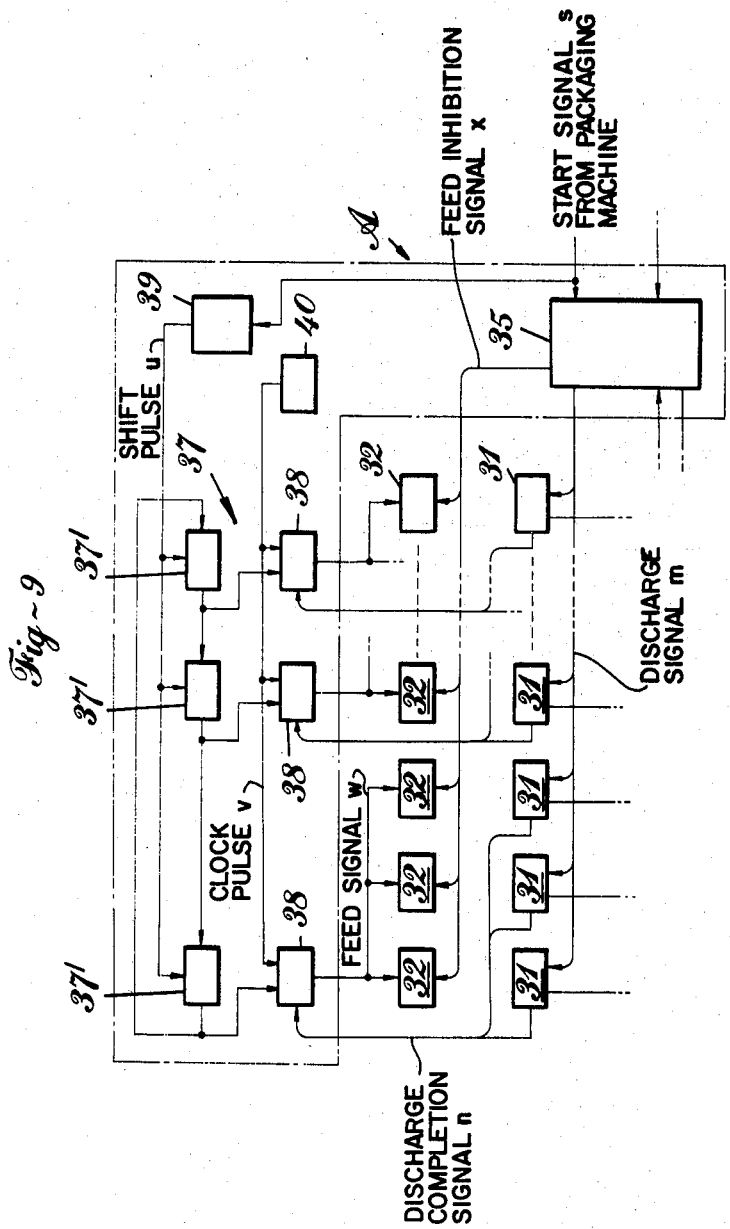

AUTOMATIC WEIGHING APPARATUS

This invention relates to an automatic weighing apparatus based, not in a limiting sense, on arithmetic operations for combinations.

Further, the invention relates to a method of combination weighing or counting and to a feed control apparatus used in such method, wherein articles received in n weighing units are caused to vary in weight and arithmetic operations for combinations of values of weight measured by the weighing units or for combinations of the respective numbers of articles therein converted from the values of weight are performed.

Further, the invention relates to a dispersion feed apparatus comprising a plurality of feed troughs radially arranged around a conical dispersion table which performs spiral reciprocating vibratory motion, the feed troughs being separately vibrated at required times so as to feed articles to weighing units. Thus, the invention is particularly effective to apply to an automatic weighing apparatus based on arithmetic operations for combinations designed to provide a predetermined value of weight or a value as close thereto as possible, utilizing a plurality of weighing units to carry out arithmetic operations for combinations of the measured values of weight.

Combination weighing or combination counting is effected by weighing articles by n weighing units, performing arithmetic operations for combinations of measured values of weight and then selecting a combination which satisfies a preset value or converting the measured values of weight into the numbers of articles and then performing arithmetic operations for combinations of that numbers and selecting a particular combination which provides a preset number of articles. In this manner, articles can be weighed or counted with high accuracy. Since this weighing or counting method based on arithmetic operations for combinations is capable of selecting a particular combination which satisfies a preset value from a large number of combinations, as described above, it is characterized in that the weighing or counting is very high in accuracy. In such method based on arithmetic operations for combinations, it is necessary that the result of arithmetic operations for combinations vary as a whole with respect to the individual combinations. That is, the calculated values of combinations must vary in a suitable range with small differences between successive values before a combination of articles which accurately corresponds to a preset weight or a preset number can be obtained. To this end, however, the amounts of articles fed to the individual weighing units must vary suitably. Therefore, the conventional method of feeding articles to the individual weighing units has been characterized in that the time for feeding articles from a feeder to a weighing unit varies with weighing units. However, when the amounts of articles fed to the weighing units are checked on, it has been found that the amount of articles fed per unit time varies with feeders and that the preset variation of articles has not been attained. When checked on, this cause has been found to be due to the fact that since articles from a common conveyor are fed to feeders, e.g., electromagnetic feeders at the same rate, the flow of articles to an electromagnetic feeder for which the feed time is set at a small value is reduced and if the number of times of feed of articles to the weighing unit is small, the articles are laid on said feeder in a thick layer, with a thick layer of articles flowing to the weighing unit. On the other hand, the flow of articles to an electromagnetic feeder for which the feed time is set at a large value is increased and if the number of times of feed of articles to the weighing unit is large, the layer of articles on the feeder is thinner than that on an electromagnetic feeder for which the number of times of feed is set at a small value, with a thin layer of articles are fed to the weighing units in such condition, there will be no difference in the actual amount of feed as a result of the amount of feed per unit time from a feeder varying with feeders, even if differences in feed time are provided. In this case, there is no variation in the amounts of articles fed to the weighing units, i.e., in the values of weight measured by the weighing units, so that even if arithmetic operations for combinations are performed after weighing, it is impossible to attain the predetermined variation of the results of the arithmetic operations for combinations and hence high accuracy which is characteristic of combination weighing or combination counting is not obtained.

In dispersion feed apparatus of this type in an automatic weighing apparatus based on arithmetic operations for combinations, one known arrangement comprises a parts feeder or ball feeder adapted to distribute articles toward the circumference, a plurality of outlets disposed around the outer periphery of the feeder, each outlet having a shutter adapted to open and close in response to signals from an associated weighing unit, the parts feeder or ball feeder being driven at all times and opened at predetermined times so as to feed articles to the associated weighing units, and the other comprises a plurality of feed troughs integral with a parts feeder or ball feeder and radially arranged around the outer periphery of the feeder, each trough having a rotary hopper which has a plurality of bucket-shaped chambers and which is adapted to rotate intermittently at predetermined times, the arrangement being such that the parts feeder or ball feeder and the feed troughs are vibrated at all times and the rotary hoppers are intermittently rotated at predetermined times so as to feed articles to the associated weighing units.

In the first-mentioned form of dispersion feed apparatus, however, the shutters tend to break or damage articles or they tend to nip or expel articles.

In the second form of dispersion feed apparatus, articles sometimes get in between the rotary hopper and the trough, and since each trough is vibrating at all times, wrappers with which articles are twist-wrapped tend to be untwisted. Further, since the parts feeder or ball feeder and the feed troughs integral therewith are vibrated by a single vibration generating device, the latter is required to have a large vibration capacity and the vibratory sounds produced thereby are high, and the manufacture of the troughs is not easy.

Therefore, there are many kinds of articles which cannnot be handled by the above described conventional dispersion apparatuses. Thus, these conventional apparatus have the disadvantage of being limited in application.

The present invention is intended to provide an automatic weighing apparatus wherein the periods of feed time for feeding articles feeders to the associated weighing units are initially set with a suitable variation and thereafter the periods of feed time set for the feeders are sequentially alloted at intervals of a suitable fixed number of times of weighing or a suitable period of time, thereby averaging the total feed time for each feeder, so that the amounts of articles fed by feeders per unit time are approximately equal and differences in feed time causes the weights of articles in the weighing units to vary, thus ensuring highly accurate combination weighing or counting.

According to the present invention, the feed times for feeding articles to individual weighing units are determined by preset values of a plurality of shift registers connected thereto and these preset values are sequentially alloted at intervals of a fixed number of times of weighing (or counting) or a fixed period of time, so that the total amount of articles fed by each feeder becomes approximately equal. Therefore, the possibility of biasing of the amount of articles laid on each feeder is eliminated and the amount of articles fed to the weighing unit is averaged by each feeder. As a result, the amount of articles to each weighing unit can be suitably varied by differences in feed time and combination weighing or combination counting can be carried out with high accuracy.

Further, the invention is intended to provide an automatic weighing apparatus comprising a plurality of feed troughs adapted to be separately vibrated and radially arranged around the outer periphery of a dispersion table which performs spiral reciprocating vibratory motion, and feeders, the arrangement being such that the feed troughs are separately vibrated for a predetermined time to enable the feeders to feed articles to the associated weighing units. According to this invention, there is no danger of articles being broken or damaged while being fed, nor is the danger of the wrappers of twist-wrapped articles being untwisted or removed. Thus, a wide variety of articles can be handled. Further, since the individual troughs are adapted to be separately vibrated at predetermined times, the electromagnetic vibrating device for each feed trough may be of small capacity and the noise due to the vibratory sounds is low. Further, the present apparatus is simple in construction and easy to manufacture, to maintain and to inspect.

These and other objects and features of the invention will become more apparent from the following description to be given with reference to the accompanying drawings, in which FIG. 1, is an elevation, in section, of an automatic weighing apparatus according to an embodiment of the invention;

FIG. 9 shows a further modification of the feed control device of FIG. 6, wherein the number of shift registers and of timer circuits is less than that of weighing units.

Figure 1:
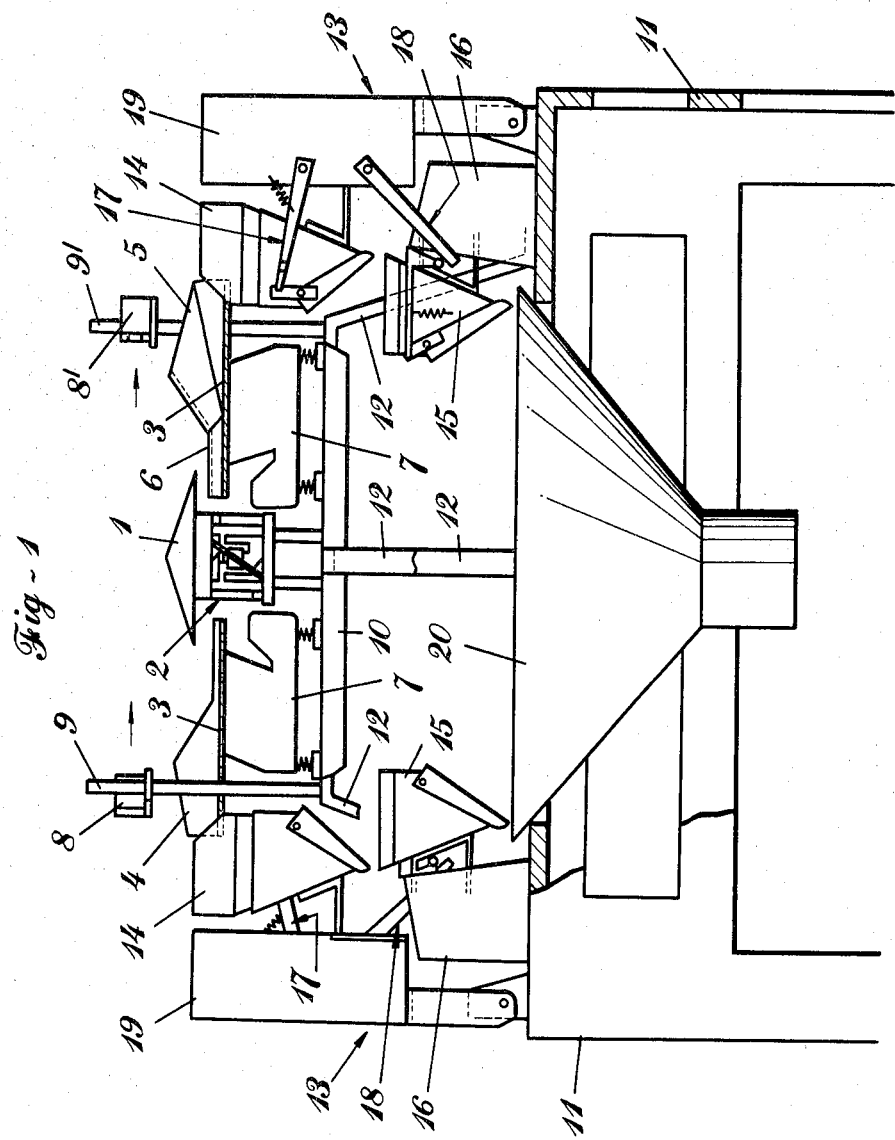
Figure 2:
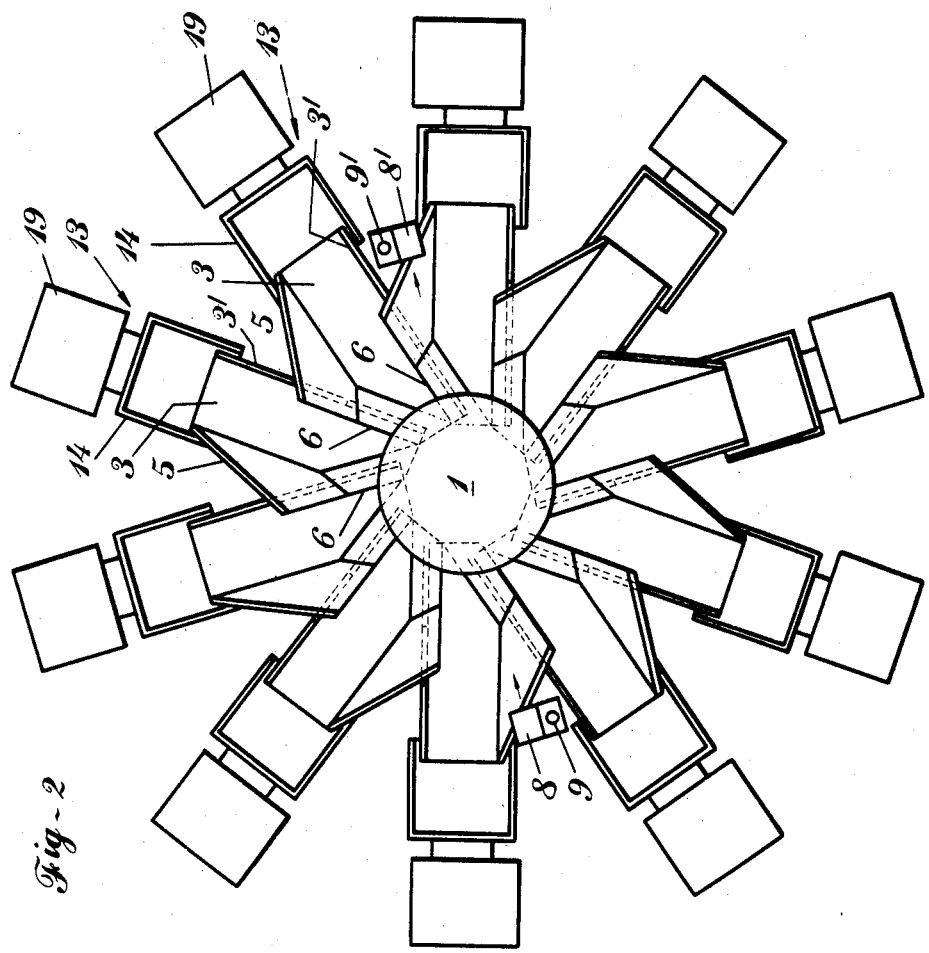
FIG. 2 is a plan view of the apparatus of FIG. 1.
Figure 3:
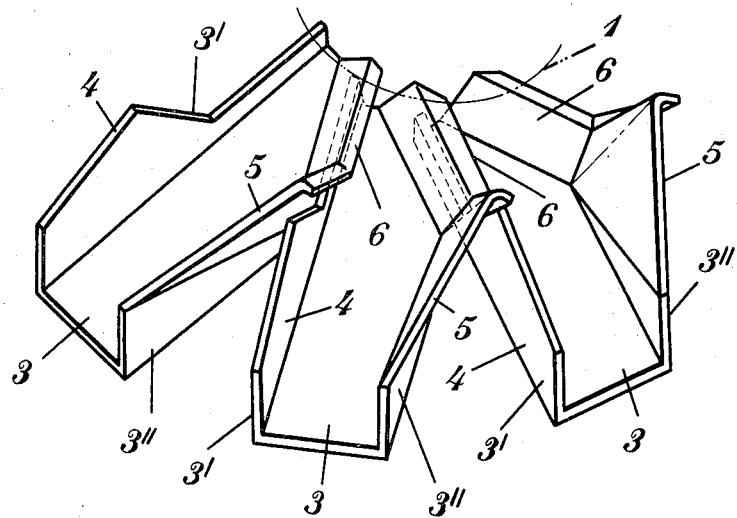
FIG. 3 is a fragmentary perspective view of feed troughs in the apparatus of FIG. 1.

In FIGS. 1 and 2, a conically shaped dispersion table 1 is fixed on an electromagnetic vibrator 2 and adapted to perform spiral reciprocating vibratory motion. Alternatively, the dispersion table 1 may be designed to rotate in one direction in which case an electric motor may be used instead of the vibrator 2. A plurality of feed troughs 3 are radially arranged around the outer periphery of the dispersion table 1, with their lower portions disposed under and out of contact with the dispersion table 1. As best seen in FIG. 3, in each feed trough 3 one lateral wall 3' is a vertical wall, approximately the front half being a triangular vertical wall 4, while the other lateral wall 3" has approximately its front ⅔ shaped as a triangular inclined wall 5, with the remaining approximately ⅓ being an inclined wall 6 outwardly tilted along approximately the rear half of one lateral wall 3' of the adjoining feed trough, approximately the rear half of the lateral wall 3" overlapping the lateral wall 3' of the adjoining feed trough 3 without contacting the same. An electromagnetic vibrator 7 is provided for each feed trough 3 and has the associated feed trough 3 fixed thereto. A light projector 8 and a light receiver 8' are opposed to each other on opposite sides of the dispersion table 1 to detect the amount of articles accumulated on the dispersion table 1 so as to control the supply of articles from a feeder 21 (FIG. 4) to the dispersion table 1. The light projector 8 and light receiver 8' are attached to posts 9 and 9', respectively, so that their vertical positions can be adjusted. A round support plate 10 is positioned over a frame 11 by a plurality of legs 12 erected on and fixed to the frame 11 and has the electromagnetic vibrators 2 and 7 mounted thereon.

Weighing units 13 each comprise a pool hopper 14 positioned below the front end of the associated feed trough 3, a weighing hopper 15 disposed therebelow, a weighing mechanism section 16 for weighing articles in the hopper 15, and a driving section 19 supporting the pool hopper 14 and having lever mechanisms 17, 18 to open and close the two hoppers 14, 15, the weighing units being arranged in a circle on the frame 11 and under the front ends of the feed troughs 3. A chute 20 is installed in the frame 11 with its upper end located somewhat above the upper surface of the frame 11, so that articles discharged from the weighing hoppers 15 of the weighing units 13 are collected in the chute 20 until they are discharged therefrom onto an unillustrated bucket conveyor situated thereunder.

Figure 4:
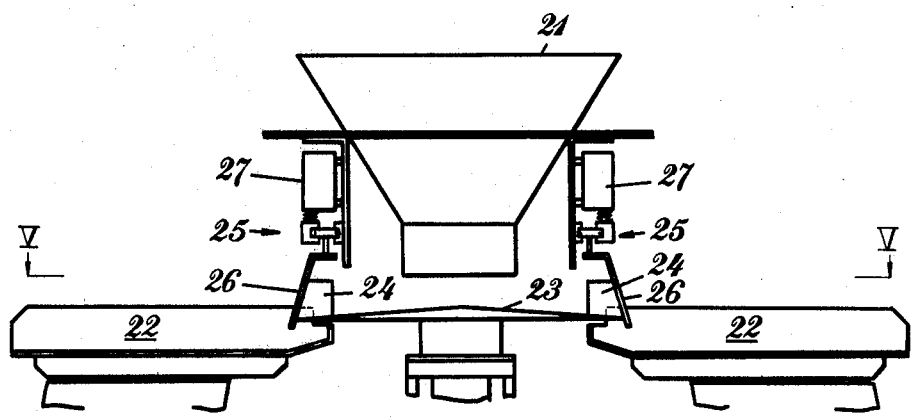
FIG. 4 shows a modification of the apparatus shown in FIG. 1.

In the above arrangement, an unillustrated feeder or that illustrated at 21 in FIG. 4 disposed above the dispersion table 1 feeds articles onto the dispersion table 1. This feeder is driven in response to a signal emitted from the light receiver 8' when the light projector 8 and receiver 8' detect the fact that the amount of articles collected on the dispersion table 1 falls below a given level. The articles fed onto the dispersion table 1 are gradually advanced radially toward the outer periphery from the conical surface of the dispersion table 1, which is performing spiral reciprocating vibratory motion, by the centrifugal force due to the twist reciprocating vibratory motion of the electromagnetic vibrator 2 and are fed in successive suitable amounts to the feed troughs 3 and collected in the latter. The articles fed to each trough 3 are gradually advanced in the feed trough 3, which is performing inclined linear reciprocating vibratory motion, toward the front end thereof by the linear reciprocating vibratory motion of the associated electromagnetic vibrator 7 and are fed from the front end to the associated pool hopper 14. When the pool hopper 14 has become empty of its contents, the associated feed trough 3 starts its vibratory motion in response to a signal from the associated weighing unit 13, the vibratory motion lasting for a fixed time determined by a timer attached to the associated feed trough 3. The vibrating time may be varied with the feed troughs 3 or it may be constant with respect to all the feed troughs.

The articles fed to the pool hopper 14 are then fed to the associated weighing hopper 15 to be weighed by the associated weighing mechanism section 16, as will be later described. Arithmetic operations for combinations of the values of weight of articles measured by the weighing units 13 are then performed by electronic circuitry to be later described and a combination of values of weight which is equal to or as close as possible to a predetermined value is selected, whereupon the weighing hoppers 15 corresponding to said selected combination are opened and then closed by the associated driving sections 19 and lever mechanisms 18 to discharge the articles into the chute 20, from which they are fed to the unillustrated bucket conveyor. The weighing hoppers 15 which are now empty of their contents are fed with articles from the associated pool hoppers 14 which are opened and closed by their driving sections 19 and lever mechanisms 17, while the associated feed troughs 3 are vibrated for a fixed time in response to signals from the associated weighing units 13 so as to feed articles to the empty pool hoppers 14. Simultaneously with the feeding of articles from the feed troughs 3 to the pool hoppers 14, the articles fed to the weighing hoppers 15 are weighed and arithmetic operations for combinations of the measured values of weight are performed and a combination which is equal to or as close as possible to the predetermind value is selected, such operations being repeated thereafter.

In addition, the articles in the weighing hoppers 15 which have not been incorporated in the selected combination are not discharged and their measured values of weight will be used again in the subsequent arithmetic operations for combinations. Therefore, the associated pool hoppers 14 are not opened and closed, nor are the associated feed troughs 3 vibrated.

The dispersion table 1 starts vibrating in response to a calculation end signal issued when arithmetic operations for combinations of the values of weight indicated by the weighing units 13 are completed, and it stops its vibration in response to a signal for starting the next arithmetic operations for combinations. That is, the dispersion table 1 stops its vibration during arithemetic operations for combinations. When the amount of articles collected on the dispersion table 1 falls below the fixed level, this is detected by the light projector 8 and light receiver 8', whereupon the light receiver 8' emits a signal to drive the feeder 21 (FIG. 4) so as to feed articles onto the dispersion table 1.

If the pool hoppers 14 or, in the case of the same not being provided, the weighing hoppers 15 have the danger of hitting in articles when they close, this can be prevented by providing a shutter device at the front end of each trough 3.

The above described embodiment shown in FIGS. 1-3, in which the radially extending troughs are arranged to overlap or nest each other, has the possibility of allowing small articles to enter or fall off through the clearances defined therebetween. A modification of the invention will now be described which is designed in consideration of this possibility so that it can be used advantageously even with such small articles.

Figure 5:
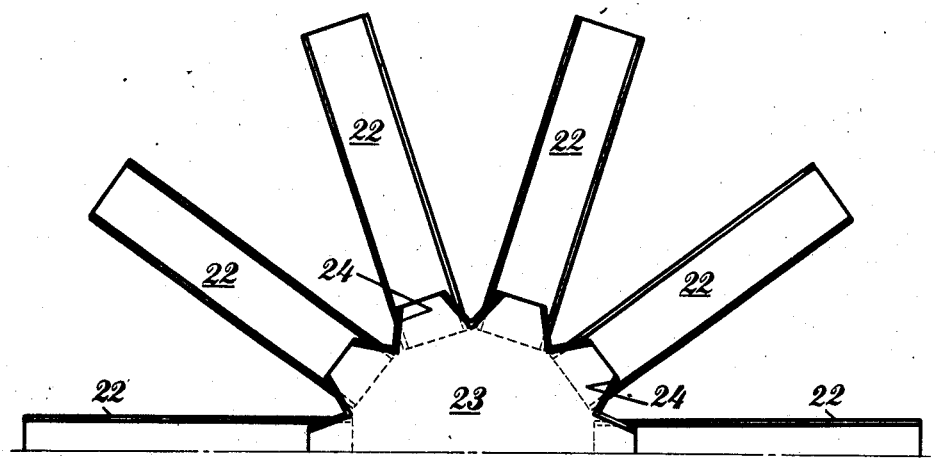
FIG. 5 is a plan view of the apparatus shown in FIG. 4.

In such modification shown in FIGS. 4 and 5, radially disposed feed troughs 22 are absolutely isolated from each other and extend outwardly from below a conical dispersion table 23. The dispersion table 23 is the same as that provided in the preceding embodiment except that it is provided with gutters 24 disposed therearound and individually associated with the feed troughs. A shutter device 25 comprising a shutter plate 26 which opens and closes is disposed on the outer side of each gutter 24. The timing for opening and closing is such that only when the troughs 22 start operation, the associated shutter plates 26 are opened by the associated drive means 27, so that just that amount of articles which is suitable for measurement is fed, so as to avoid overfeed.

The above embodiments have been described as being arranged to dispersively feed articles to the weighing hoppers of the weighing units of an automatic weighing apparatus which is based on arithmetic operations for combinations, but the invention is also applicable to cases where no arithmetic operations for combinations are performed.

The parts which perform said arithmetic operations for combinations and control the feeding of articles will now be described.

Figure 6:
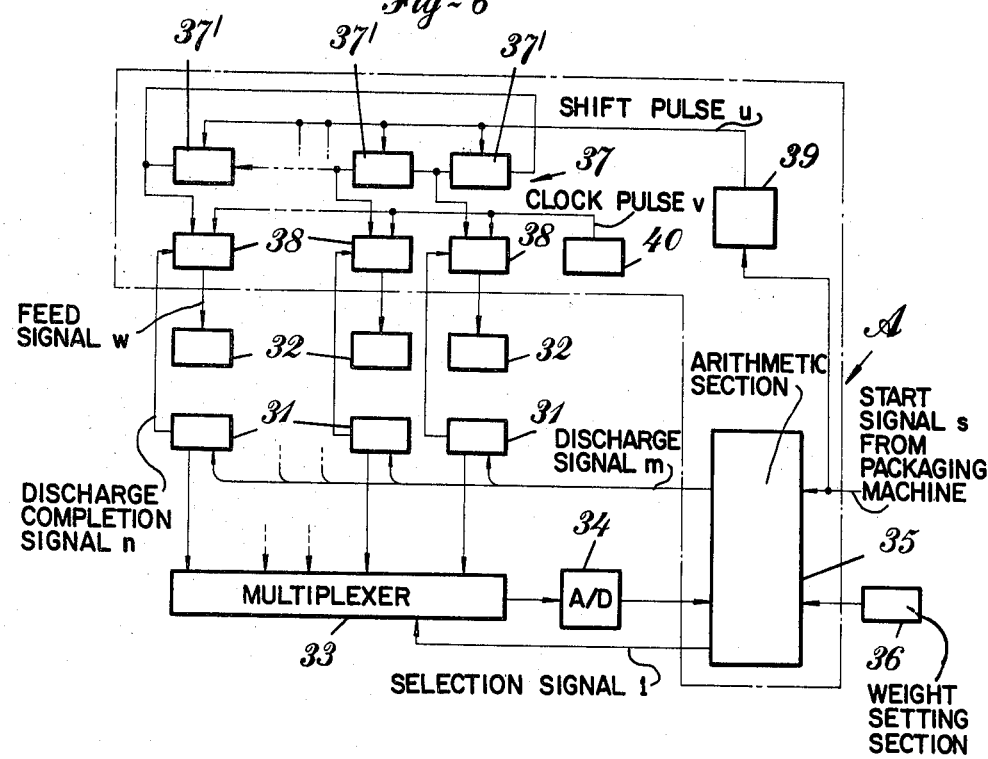
FIG. 6 is a block diagram of a feed control device in the apparatus shown in FIG. 1, wherein the number of shift registers and of timer circuit is the same as that of weighing units.

In FIG. 6, the numeral 31 denotes weighing units; 32 denotes feeders associated with the weighing units 31; 33 denotes a multiplexer composed of analog switches, etc.; 34 denotes an A/D converter; 35 denotes an arithmetic section which stores the values of weight indicated by the weighing units 31, performs arithmetic operations for combinations and issues various control signals; 36 denotes a weight value setting section which sets the value of weight for articles at which it is desired to discharge the articles; 37 denotes a timer time storing section composed of that number of shift registers 37' which corresponds to the number of feeders; 38 denotes timer circuits which issue signals to the associated feeders 32 for periods of time which are proportional to the set values in the associated shift registers 37'; 39 denotes a shift pulse generating section which counts start signals s from a packaging machine and emits a shift pulse u to each of the shift registers 37' of the timer time storing section 37 when the count value reaches a fixed value; and 40 denotes a clock pulse generating section which feeds clock pulses v to a down-counter, to be later described, provided in the timer circuit 38. The portion A surrounded with a dash-dot line is the control section of the invention.

This apparatus functions as follows.

When power is put in, during the initialization time thereof the shift registers 37' of the timer time storing section 37 are stored with set values corresponding to suitably varied timer time values by a plurality of digital switches, etc. (not shown). The timer circuits 38 output feed signals w to the feeders 32 for varied periods of time which are proportional to the set values for the associated shift registers 37'; and the weighing units 31 weigh the articles. It is to be understood that prior to this point of time, the value of weight for articles at which it is desired to discharge the articles was set by the weight value setting section 36. The arithmetic section 35 waits for the arrival of a start signal s from the packaging machine which indicates the completion of preparation for packaging, and it starts arithmetic operations upon arrival of such signal. First, the arithmetic section 35 sends a selection signal 1 to the multiplexer 33 and allows the values of weight indicated by the weighing units 31 in analog representation to pass sequentially through the multiplexer 33, the values being converted into digital values in the A/D converter 34 and then read into the arithmetic section 35 to be stored therein. Next, arithmetic operations for combinations of the values of weight indicated by the weighing units and stored in the arithmetic section 35 are performed. The resulting combinations and combined values are then stored. The combination which has the combined weight value which is equal to or as close as possible to the set value set by the weight setting section 36 is retrieved. When the retrieval is completed and such combination is selected, discharge signals m are fed to the weighing units corresponding to said combination. The discharged articles are packaged by the packaging machine. Any weighing unit that has completed its discharge operation sends a discharge completion signal n to the associated timer circuit 38 which is then actuated to transfer a feed signal w to the associated feeder 32, which, in response to the signal, is actuated to feed articles again to the emptied weighing units 31. In addition, the feed time for each feeder is proportional to the value set in the shift register 37' to which the timer circuit 38 corresponds. Thereafter, the arithmetic section 35 waits for the arrival of a start signal s, and upon arrival of a start signal s, it starts arithmetic operations again in the same procedure as described above. With such operations repeated, automatic weighing can be continuously effected.

The sequential allotment of periods of time of feed of articles for each weighing unit 31, which characterizes the invention, is as follows.

The embodiment shown in FIG. 6 is so arranged that the shift pulse generating section 39 counts start signals s and when it counts a fixed number, e.g., 5, it sends a shift pulse u to each shift register 37'. That is, when several times, e.g., 5, of weighing are completed, a shift pulse u is inputted, whereby the set values which are set and stored in the initialization time are sequentially alloted, one followed by the adjoining one. In the subsequent weighing operations, the feed time for each weighing unit 31 is changed. Thus, the feed time for each feeder varies at intervals of a fixed number of times of weighing, and since such periods of feed time are circulated through the weighing units 31 in a sequential manner, the respective periods of time of feed to the weighing units are, on an average, approximately the same. Therefore, the total amount of articles fed by each feeder is approximately the same as that fed by any of the other feeders, so that there is no possibility of articles being collected too much on a particular feeder or feeders. Therefore, the amount of articles fed by each feeder 32 per unit time is approximately constant. As a result, the amount of articles fed is proportional to the amount of feed time, so that the intended object of causing articles to vary in weight with the weighing units 31 can be attained.

In addition, in the above embodiment, the shift pulse generating section 39 counts start signals s, whereby it generates a shift pulse at intervals of a fixed number of times of weighing so as to effect sequential allotment of set values stored in the shift registers 37'. Such sequential allotment of set values may be effected at intervals of a fixed period of time, e.g., one minute, as well as at intervals of a fixed number of times of weighing.

A concrete example of the timer circuits 38 shown in FIG. 6 will now be described with reference to FIG. 7.

The numeral 41 denotes a down-counter; 42 denotes a zero detecting circuit; 43 denotes an AND circuit; and 44 denotes a flip-flop circuit. The operation of the timer circuit 38 is started when it receives a discharge completion signal n from the associated weighing unit 31. That is, when a discharge completion signal n is inputted into the presetting terminal PR of the down-counter 41, the down-counter 41 reads in and stores the set value which is being outputted by the shift register 37'. Further, the discharge completion signal n is also inputted into the setting terminal B of the flip-flop circuit 44 at the same time, thereby setting the same and putting its Q output at the high level. This high level output is transferred to to the feeder 32 to cause the latter to start feeding articles. Further, this high level output is inputted into one input terminal of the AND circuit 43, and the clock pulses V outputted by the clock pulse generating section 40 are inputted into the count terminal CP of the down-counter 41. Thereupon, the down-counter 41 starts counting down with the initial value the set value which has been read in from the shift register 37' and stored therein, and the count value outputted from the output terminal Q thereof decreases. When the count value becomes zero, the zero detecting circuit 42 detects this and resets the flip-flop circuit 44. When the flip-flop circuit 44 is reset, the Q output thereof goes to the low level and the feeding of articles at the feeder 32 stops and the down-counter 41 stops its counting down operation. In this way, the timer circuit 38 transfers the high level signal, namely, feed signal w to the feeder 32 for a period of time proportional to the set value stored in the shift register 37', so as to feed articles. An example of the numerical setting of the shift register in this embodiment will be given. Suppose that the frequency of clock pulses v generated by the clock pulse generating section 40 is 10 Hz. Then, since 0.1 second elapses per pulse, if it is desired to set the timer time at 0.6 second this is achieved by setting at 6 the value which is to be stored in the shift register 37'.

Figure 7:
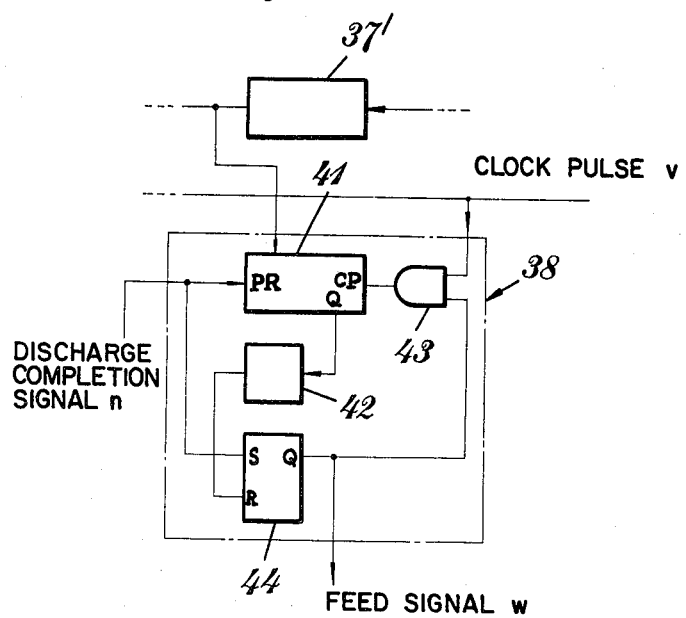
FIG. 7 shows a concrete example of a timer circuit shown in FIG. 6.

Besides the timer circuit 38 in the form using a down-counter shown in FIG. 7, other various forms may be contemplated. For example, an up-counter may be used to count up clock pulses from zero while using a comparator to compare the count value with the output from the shift register 37', the coincidence being then used to determine the timer time. Further, it may be composed of a monostable circuit or the like. In that case, it is so arranged that the time constant of the monostable circuit is variable with the output value of the shift register 37'. In addition, in the case of a timer circuit using the up-counter or monostable circuit, if the sequential allotment in the shift register is effected at intervals of a fixed period of time (for example, one minute), it is so arranged that the sequential allotment is inhibited when the timer circuit is in operation, i.e., when the up-counter is counting or the monostable circuit is operating. Thus, the sequential allotment is effected when the timer circuit is inoperative.

The operation of the timer circuit which determines the timing for feed start, in the above embodiment, is started when the weighing unit 31 emits a discharge completion signal n. This timing may be provided by other means. For example, a fixed period of time after the discharge is completed subsequently to the emission of a discharge signal m from the arithmetic section 35, a start signal, instead of the discharge completion signal n, may be emitted from the arithmetic section 35 to the timer circuit 38.

In the above description, as for the set values to be stored in the timer time storing section 37, mutually different values are stored in the shift registers 37', but this is not absolutely necessary. For example, the same value may be set in two or three shift registers so that every two or three shift registers has a value different from those in the other shift registers. In that case, it is not absolutely necessary to provide the same number of shift registers and of timer circuits as the number of weighing units.

Figure 8:
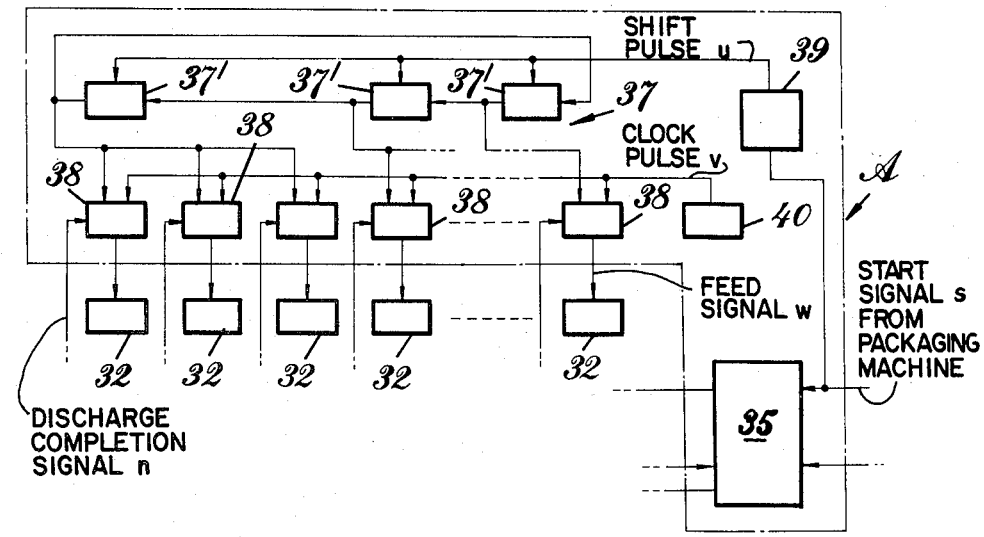
FIG. 8 shows a modification of the feed control device of FIG. 6, wherein the number of shift registers is less than that of weighing units.

For example, FIG. 8 is a schematic view of the principal portion wherein the number of shift registers 37' is less than that of weighing units 31. Thus, this arrangement comprises 9 weighing units 31 and 3 shift registers 37', each shift register 37' having its output connected to 3 timer circuits 38. Therefore, every 3 timer circuits 38 has the same operating time, so that there are 3 operating times as a whole. Thus, if set values proportional to the feed times stored in the 3 shift registers 37' are regularly sequentially alloted, the time of feed of articles to the weighing units 31 varies. In addition, the connections between the shift registers 37' and the timer circuits 38 and between the timer circuits 38 and the feeders 32 may be such that 3 adjoining feeders 32 have the same feed time, as shown in FIG. 8, or such that adjoining feeders 32 have different feed times.

The embodiment shown in FIG. 8 is so arranged that every 3 of the nine timer circuits 38 has the same set value inputted thereinto, but it is possible to provide the same number (3) of timer circuits 38 as that of shift registers 37'. FIG. 9 is a schematic view of the principal portion using such arrangement, wherein each shift register 37' has its output connected to a timer circuit 38 and each timer circuit 38 has its output connected to 3 feeders 32. In this case, however, when one timer circuit 38 operates, a feed signal w is inputted into the 3 feeders 32 connected thereto. Therefore, it is so arranged that the arithmetic section 35 emits a feed inhibition signal x to the feeders 32 corresponding to the weighing units 31 which are not discharging articles, so as to prevent articles from being fed to the weighing units 31 which are not discharging articles. In addition, the timer circuits 38 may have their outputs connected to the feeders 32 so that feed times for adjoining feeders may differ.

In the above embodiments of the invention, the feed times for the feeders are regularly sequentially alloted, but it is also possible to effect this sequential allotment regularly for only some of the feeders, while fixing the feed times for the remaining feeders as in the usual practice.

Further, the control section A of the present invention can be composed of circuits of hardwear separately making the various circuits of exclusive IC's, etc., but it is also possible to make the control section A of a microcomputer in its entirety.

In addition, the embodiments of the invention illustrated in the Figures refer to combination weighing, but the invention is also applicable to combination counting wherein values of weight measured by n counters are converted into the respective numbers of articles in the weighing units to calculate combinations of such numbers, so as to discharge a predetermined number of articles. Further, arithmetic operations for combinations may be performed by various other methods than those described above.

What is claimed is:

1. An automatic combination weighing apparatus comprising:
    a conical dispersion table;
    means for driving said dispersion table to cause articles fed on said dispersion table to move outwardly and circumferentially thereon;
    a plurality of feed troughs radially arranged around said dispersion table to receive articles from said dispersion table;
    a plurality of vibrator means for individually driving said feed troughs in an inclined linear reciprocating vibrating motion thereby advancing articles thereon toward the front end thereof;
    a plurality of weighing means positioned under the front ends of said feed troughs and associated therewith, each weighing means including at least a weighing hopper and a weighing mechanism;
    control circuit means coupled to said weighing means for calculating combinations of weights on the basis of values of weight of articles measured by said weighing means, wherein the sum weight of the combination of articles is equal to or closest within a preset range of allowance to a predetermined weight value, and for discharging articles in the weighing hoppers of the weighing means corresponding to the predetermined weight value; and
    a chute for collecting articles discharged from said weighing hoppers and for dumping the articles outside the apparatus.

2. An automatic combination weighing apparatus as defined in claim 1, wherein each of said weighing means includes a pool hopper interposed between the feed trough and the weighing hopper to temporarily hold articles received from the associated feed trough.

3. An automatic combination weighing apparatus as defined in claim 1, wherein said control circuit means divides the weight of articles in each weighing means by the unit weight of articles to obtain the number of articles in the weighing means and the combination calculation is performed on the basis of the number of articles.

4. An automatic combination weighing apparatus as defined in claim 1, including means for detecting the amount of articles accumulated on said dispersion table and for controlling the feed of articles onto said dispersion table.

5. An automatic combination weighing apparatus as defined in claim 4, wherein said detecting means comprises a light projector and a light receiver opposed to each other across said dispersion table.

6. An automatic combination weighing apparatus as defined in claim 1, wherein said dispersion table is actuated intermittently.

7. An automatic combination weighing apparatus as defined in claim 6, wherein actuation of said dispersion table is initiated in response to a calculation end signal and actuation is stopped in response to a calculation start signal.

8. An automatic combination apparatus as defined in claim 6, wherein said means for driving said dispersion table is a vibrator for causing said dispersion table to perform spiral reciprocating vibration motion.

9. An automatic combination weighing apparatus as defined in claim 6, wherein said means for driving said dispersion table is an electric motor for rotating said dispersion table unidirectionally.

10. An automatic combination weighing apparatus as defined in claim 1, wherein only those feed troughs associated with the weighing means corresponding to the particular combination start vibrating.

11. An automatic combination weighing apparatus as defined in claim 1 or 10, wherein the vibratory motion lasts for a period of time set for each feed trough.

12. An automatic combination weighing apparatus as defined in claim 11, wherein said control circuit means includes a feed control means for causing periods of time of the vibratory motion for the individual feed troughs to be varied one from the other and to shift sequentially.

13. An automatic combination weighing apparatus as defined in claim 12, wherein said control circuit means comprises a timer means including a plurality of shift registers, said shift registers storing different set values, timer circuits equal in number to said shift registers and adapted to transmit signals to said vibrators to thereby actuate the associated feed troughs for periods of time proportional to the set values in said shift registers, a shift pulse generating means for transmitting shift pulses to said shift registers to cause the set values in said shift registers to shift sequentially, and a clock pulse generating means for transmitting clock pulses to said timer circuits.

14. An automatic combination weighing apparatus as defined in claim 13, wherein said shift pulse generating means generates shift pulses at fixed time intervals.

15. An automatic combination weighing apparatus as defined in claim 13, wherein said shift pulse generating means generates shift pulses at intervals of a fixed number of times of weighing.

* * * * *